Figure 1:
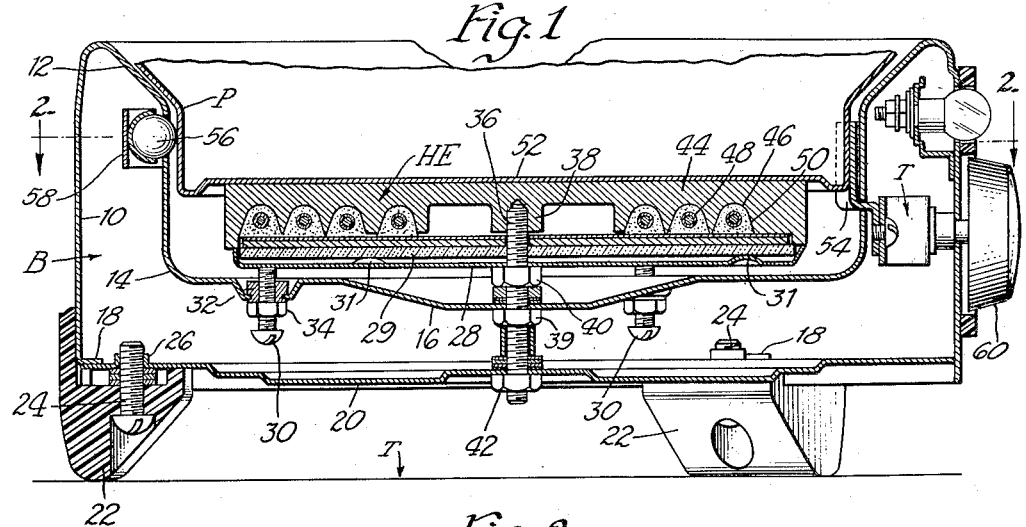

Oct. 12, 1954     A. J. HUCK     2,691,717
ELECTRICAL APPLIANCE HEATER

Filed Dec. 30, 1950

Inventor
Alfred J. Huck
by Bair, Freeman & Molinare
Attorneys

Patented Oct. 12, 1954

2,691,717

UNITED STATES PATENT OFFICE 2,691,717

ELECTRICAL APPLIANCE HEATER

Alfred J. Huck, St. Louis, Mo., assignor to Knapp-Monarch Company, St. Louis, Mo., a corporation of Delaware Application December 30, 1950, Serial No. 203,680

4 Claims. (Cl. 219—43)

This invention relates to a heater for electrical appliances and particularly a heating base for a cooking pan of the type shown in my co-pending application Serial No. 183,269, filed September 5, 1950.

One object of the invention is to provide a heater for a cooking pan having several features of novelty operable to concentrate the heat effectively into the cooking pan yet provide for removability of the pan with respect to the heating element, the arrangement being suitable for providing an efficient deep fat fryer of this general character.

Another object is to provide an electrical appliance heater including a base having a heating element supported thereby, the base being designed for minimum transmission of heat from the heating element thereto and maximum transmission of heat to a cooking pan supported within the base on the heating element.

Still another object is to provide a heating element having considerable mass for heat storage purposes and constructed to have intimate contact with the cooking pan so that an efficient deep fat fryer combination results from the use of my electrical appliance heater and a cooking pan removably supported therein.

A further object is to provide a base which is so designed as to be relatively cool without the necessity of providing thick walls of insulation, the base being formed of brightly polished aluminum for maximum heat reflection to aid in concentrating the heat from the heating element on the cooking pan and the heating element being supported rigidly with respect to the base but in such manner that heat transmission from the heating element to the base is minimized.

Still a further object is to provide a baffle plate and insulating arrangement for the heating element to also aid in the concentration of the heat in the heating pan and to provide a bottom plate for the base cooperating with the heating element to hold it rigidly in place, the heating element being adjustable in position relative to the base for properly spacing the cooking pan when on the heating element from the base to prevent heat loss from the cooking pan to the base.

An additional object is to provide feet of insulating material for the base to support it above a table top or the like so as to keep the table top from being overheated.

Figure 2:
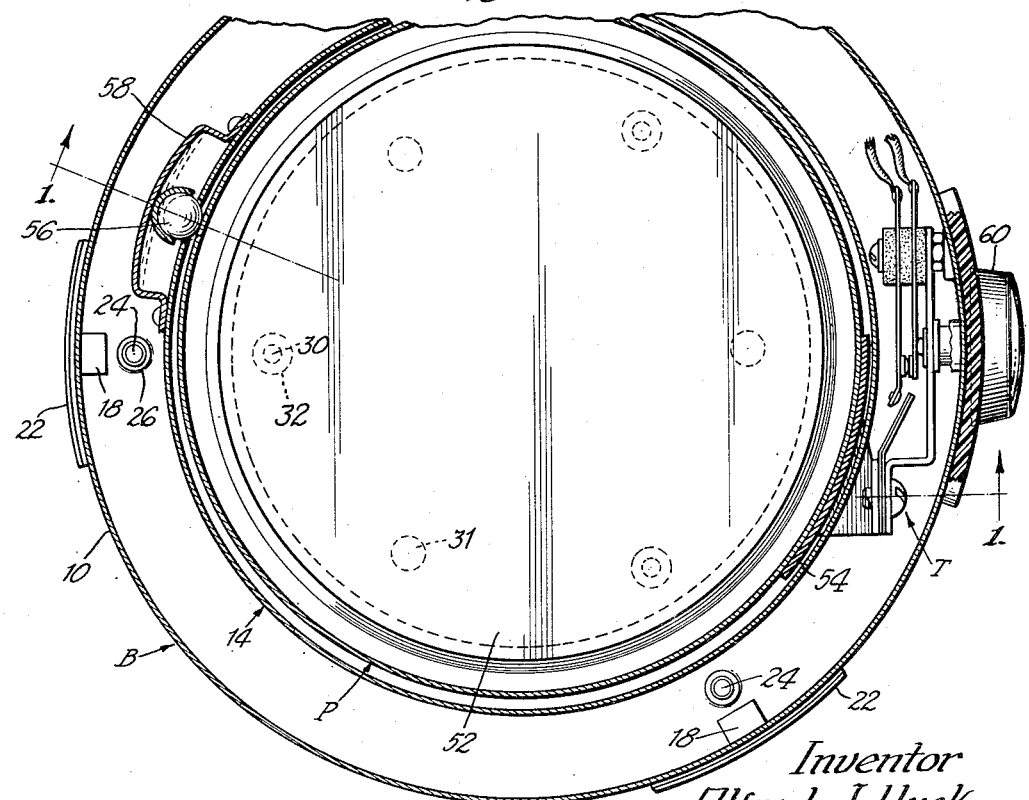

With these and other objects in view, my invention consists in the construction, arrangement and combination of the various parts of my electrical appliance heater, whereby the objects contemplated are attained, as hereinafter more fully set forth, pointed out in my claims and illustrated in the accompanying drawings, wherein:

Figure 1 is a vertical sectional view through an electrical appliance base embodying my present invention and showing the lower portion of the cooking pan supported on the heating element of the heater; and Figure 2 is a horizontal sectional view on the line 2—2 of Figure 1, the line 1—1 of Figure 2 serving to indicate where the section is taken for Figure 1.

On the accompanying drawing I have used the reference character B to indicate a base, HE a heating element, and P a cooking pan. The base B has an outer cylindrical wall 10, a conical upper wall 12, and an inner cylindrical wall 14 terminating in a bottom wall 16. A plurality of fingers 18 around the lower edge of the wall 10 are bent inwardly and a bottom plate 20 is engaged upwardly thereagainst by means which will hereinafter be described. The base B and the bottom plate 20 are supported by three feet 22 of insulating material, screws 24 being threaded into bosses 26 of the bottom plate 20 to retain the feet in position.

The heating element HE is supported on a baffle plate 28 formed of stainless steel and this plate in turn is supported on three adjusting screws 30. The screws 30 are threaded in bosses 32 secured to the bottom wall 16 of the base B and after adjustment are locked by lock nuts 34. The heating element HE and its baffle plate 28 are held against the screws 30 by a central tie rod 36 threaded into a boss 38 of the heating element and passing through the plate 28 and through the bottom wall 16 of the base. A nut 39 is provided on the tie rod 36 to clamp the parts together and another nut 40 is provided to clamp the baffle plate 28 to the heating element with an insulating disc 29 of asbestos or the like interposed between the heating element and the baffle 28, the baffle plate having three projections 31 to support the disc. The lower end of the tie rod 36 extends on downwardly through the bottom plate 20 and is provided with a nut 42 to draw the plate 20 against the fingers 18.

The heating element HE includes a plate 44 of cast iron or the like having considerable mass for heat storage purposes. Spiral grooves 46 are provided therein in the usual manner in which a resistance coil 48 is located, ceramic 50 or similar insulating material being provided to insulate the resistance coil from the plate 44. The top surface of the plate 44 is ground smooth and flat for contact with the bottom 52 of the pan P, which bottom is also formed flat for full contact of its area with the top surface of the heating plate 44.

As disclosed and claimed in my copending application above referred to, a thermostat T is provided mounted on a heat conductor bracket 54 with which one side of the pan P contacts, a ball 56 at the opposite side serving to effect such contact under the action of a leaf spring 58 secured to the base wall 14, the thermostat thereby closely following the temperature of the cooking pan. Its operating point may be adjusted by a knob 60 in the usual manner, the contacts of the thermostat, of course, being in the circuit of the resistance coil 48.

The herein disclosed features of an electrical appliance base offer a design wherein the heat generated by the heating element is prevented from being directed anywhere except directly into the food container or pan P. This pan is made preferably of quite heavy sheet aluminum, for instance, about $\frac{1}{16}''$ thick. Aluminum, having high thermal conductivity, conducts the heat imparted to the bottom 52 upwardly along the walls of the pan and thus into the food being cooked. This is particularly desirable in connection with deep fat frying and similar operations wherein the pan contains cooking oil.

The relatively large mass of the heating plate 44 permits it to store heat, a feature which is especially useful in deep fat fryers. One of the hardest cooking operations is to make "French fried potatoes. If a reasoable quantity of raw potatoes are lowered into the pan P having heated cooking oil therein, the usual problem is that the oil temperature reduces radially due to the cooling effect caused by the moisture in the potatoes. This reduction in oil temperature must be overcome by additional heating from the heating element before the oil temperature is again restored to approximately 350° F. for properly frying the potatoes. With the heating element disclosed, the mass thereof provides sufficient heat energy storage to continue feeding heat immediately to the pan and the oil so that a radical reduction in timing is provided for the French frying operation. I have found that this timing is approximately ten minutes with the construction disclosed compared with approximately twice that length of time when a conventional radiation type of heating element is used.

The upper surface of the heating element being ground flat permits the container to rest in full contact therewith which also aids in the rapid conduction of heat from the heating element to the pan even though the pan is removably positioned relative to the heating element.

The design of the base B is such as to provide a double-walled construction between the bottom side walls of the pan P where the oil is held and the surrounding atmosphere. The base is also designed to have spaces between the walls 10 and 14 and between the plates 16 and 20 which serve as heat reflectors to prevent loss of heat outwardly and downwardly. This base is preferably of aluminum with its entire surface which faces the container, that is, the surfaces 12, 14 and 16 brightly polished so as to reflect any heat from the heating element directed toward these surfaces back to the pan P. Aluminum retains its brightly polished finish even after numerous heating operations as it does not discolor appreciably when it encounters temperatures on the order of 200° F. to 500° F. as is the case in the construction disclosed. To minimize actual conduction of the heat from the heating element to the base, the three screws 30 serve, together with the center tie rod 36, as a means of minimum contact area between the heating element surfaces and the base surface.

The stainless steel baffle plate 28 interposed between the heating element and the base wall 16 together with the asbestos insulating disc 29 serve further to prevent loss of heat by radiation from the bottom of the heating element, the three point support 31 for the disc 29 also aiding in this respect. The bottom plate 20 is preferably made of plated sheet steel so that it also serves as a heat reflector and as a second outer wall to the bottom of the entire base structure to prevent loss of heat from the base assembly and to minimize the radiation of heat to a supporting surface such as a table top T on which the appliance may be supported. The plastic feet 22 serve to space the plate 20 sufficiently far from the surface T to prevent damage thereto as a result of what little temperature there is in the plate 20 during prolonged operation of the appliance.

From the foregoing description, it will be obvious that the combination of features in the design of the individual parts as enumerated causes a high efficiency of heat transfer from the heating element to the cooking pan and minimizes heat loss in all other directions. At the same time, the structure is such as to eliminate the necessity of using asbestos or other heat retarding fibers between the inner and outer walls of the heater base which latter design frequently causes trouble such as interference with the operation of thermostat contact points and the like. The resulting structure is also relatively light weight which is a further advantage.

Some changes may be made in the construction and arrangement of the parts of my electrical appliance heater without departing from the real spirit and purpose of my invention, and it is my intention to cover by my claims any modified forms of structure or use of mechanical equivalents which may be reasonably included within their scope.

I claim as my invention:

1. In an electrical appliance heater, a sheet metal base having outer and inner cylindrical walls connected together at the top and having a bottom wall at the lower end of said inner cylindrical wall, a heating element supported on said bottom wall, a bottom plate for said base spaced from said bottom wall, a tie bolt tying said bottom plate and said heating element together, said heating element including a relatively large mass of metal for heat storage purposes which is smooth and flat on top for making contact with a cooking pan, a resistance element imbedded in said mass of metal, heat conducting, electric insulating material completely spanning the distance between said resistance element and said mass of metal for maximum efficiency of operation, a backing of insulating material for said resistance element and its heat conducting, electric insulating material, a baffle plate between said backing of insulating material and said bottom wall, and a nut on said tie bolt to support said baffle plate, said baffle plate supporting said backing of insulating material.

2. In an electrical appliance heater, a base having an outer cylindrical wall, an inner cylindrical wall spaced therefrom, a top annular wall connecting said outer and inner cylindrical walls together and a bottom wall at the lower end of said inner cylindrical wall, a heating element located on said bottom wall, a bottom plate for said base spaced from said bottom wall, a baffle plate between said heating element and said bottom wall, said baffle plate being formed of stainless steel and having projections upwardly therefrom, a disc of insulation supported on said projections between said baffle plate and said heating element, a three-point support for said heating element on said bottom wall comprising adjusting screws adjacent its periphery for adjusting the height of said heating element relative to said bottom wall, said adjusting screws being threaded in said bottom wall and contacting said baffle plate, and a single tie bolt at the center of said heating element for drawing it into contact with said adjusting screws.

3. In an electrical appliance heater, a base having an outer cylindrical wall, an inner cylindrical wall spaced therefrom, said walls being connected together at the top, a bottom wall at the lower end of said inner cylindrical wall, a heating element located above said bottom wall and within said inner cylindrical wall, a bottom plate for said base spaced from said bottom wall, a three-point support for said heating element comprising adjusting screws threaded in said bottom wall for adjusting the height of said heating element relative thereto a single threaded rod connected with the center of said heating element and extending through said bottom wall and said bottom plate, a nut thereon to retain said heating element against three screws, and a second nut thereon to retain said bottom plate mounted on said base.

4. In an electrical appliance heater, a base having an outer cylindrical wall, an inner cylindrical wall spaced therefrom, said walls being connected together at the top, a bottom wall at the lower end of said inner cylindrical wall, a heating element located on said bottom wall, a bottom plate for said base spaced from said bottom wall, said heating element including a relatively large mass of metal for heat storage purposes, a baffle plate between said heating element and said bottom wall and having projections upwardly therefrom, a disc of insulation supported on said projections between said baffle plate and said heating element, a three point support for said heating element on said bottom wall comprising supporting screws threaded relative to said bottom wall and engaging the bottom surface of said baffle plate adjacent its periphery, and means at the center of said heating element and disc for holding said heating element and said baffle plate in engagement with said supporting screws.

References Cited in the file of this patent

UNITED STATES PATENTS

| Number | Name | Date |
|---|---|---|
| 1,021,230 | Ball | Mar. 26, 1912 |
| 1,154,411 | Kuhn et al. | Sept. 21, 1915 |
| 1,238,808 | Patten | Sept. 4, 1917 |
| 1,380,753 | Trouilhet et al. | June 7, 1921 |
| 1,534,823 | Ziola | Apr. 21, 1925 |
| 1,621,758 | Shaw | Mar. 22, 1927 |
| 1,738,908 | Kuhn | Dec. 10, 1929 |
| 1,878,140 | Hicks | Sept. 20, 1932 |
| 1,983,211 | Wolcott | Dec. 4, 1934 |
| 2,119,421 | Cross | May 31, 1938 |
| 2,470,715 | Olivares | May 17, 1949 |
| 2,496,654 | Alsdorf | Feb. 7, 1950 |

FOREIGN PATENTS

| Number | Country | Date |
|---|---|---|
| 274,254 | Great Britain | July 21, 1927 |